US008438113B2

(12) United States Patent
Stahl

(10) Patent No.: US 8,438,113 B2
(45) Date of Patent: May 7, 2013

(54) AUTOMATED DIGITAL EXPRESS GATEWAY FOR LICENSING AND ACQUIRING RIGHTS AND PERMISSIONS FOR 3RD PARTY COPYRIGHTED CONTENT

(76) Inventor: Richard Stahl, Bloomfield Hills, MI (US)

(*) Notice: Subject to any disclaimer, the term of this patent is extended or adjusted under 35 U.S.C. 154(b) by 209 days.

(21) Appl. No.: 13/010,806

(22) Filed: Jan. 21, 2011

(65) Prior Publication Data

US 2011/0184871 A1 Jul. 28, 2011

Related U.S. Application Data

(60) Provisional application No. 61/297,850, filed on Jan. 25, 2010.

(51) Int. Cl.
*G06F 21/00* (2006.01)
(52) U.S. Cl.
USPC .................. 705/59; 705/54; 705/57; 705/67; 705/902; 726/28; 726/29; 726/30; 726/31; 726/32; 715/743; 715/745
(58) Field of Classification Search .................... 705/54, 705/57, 59, 902; 715/743, 745; 726/28–32
See application file for complete search history.

(56) References Cited

U.S. PATENT DOCUMENTS

| | | | | |
|---|---|---|---|---|
| 6,134,659 A * | 10/2000 | Sprong et al. | ................. | 713/190 |
| 6,510,513 B1 * | 1/2003 | Danieli | .......................... | 713/156 |
| 6,920,567 B1 * | 7/2005 | Doherty et al. | ................. | 726/22 |
| 7,260,556 B2 * | 8/2007 | Stefik | .............................. | 705/52 |
| 7,269,788 B2 * | 9/2007 | Gharavy | ....................... | 715/234 |
| 7,577,999 B2 * | 8/2009 | Narin et al. | ..................... | 726/27 |
| 7,761,591 B2 * | 7/2010 | Graham | ........................ | 709/233 |
| 8,001,612 B1 * | 8/2011 | Wieder | ............................ | 726/28 |
| 8,027,925 B1 * | 9/2011 | Garst et al. | ..................... | 705/59 |
| 8,230,515 B1 * | 7/2012 | Brewton et al. | ................. | 726/27 |
| 2001/0011254 A1 * | 8/2001 | Clark | .............................. | 705/59 |
| 2004/0054930 A1 * | 3/2004 | Walker et al. | ................. | 713/202 |
| 2005/0021995 A1 * | 1/2005 | Lal et al. | ....................... | 713/200 |
| 2006/0031164 A1 * | 2/2006 | Kim | .................................. | 705/51 |
| 2006/0056324 A1 * | 3/2006 | Hyyppa et al. | ................ | 370/310 |
| 2006/0143447 A1 * | 6/2006 | Vasishth et al. | ............... | 713/166 |
| 2006/0168614 A1 * | 7/2006 | Salas et al. | ..................... | 725/23 |

(Continued)

OTHER PUBLICATIONS

Renato Iannella, Open Digital Rights Language (ODRL) Version 1.1, all pages, Aug. 8, 2002.*

(Continued)

*Primary Examiner* — Calvin Cheung
(74) *Attorney, Agent, or Firm* — Oakwood Law Group, LLC; Jie Tan

(57) ABSTRACT

The invention provides an end-to-end automated streaming workflow process which enables real-time or batch processing to grant licenses and to acquire licenses for $3^{rd}$ party copyrighted content. Using a computer, the invention automates the permissions transaction process of procuring and processing licenses real-time or by batch, reducing lead-times from many weeks or months to hours, automatically transforming and translating requests and responses for global e-commerce among multi-vendor systems and non-standard rights semantics and languages, eliminating or reducing manual labor effort, negotiating licensing fees to conform with specifications, protecting rights-holders' intellectual property rights and assuring rights-holders they are fairly compensated and paid for their work, identifying "public domain" and/or "fair use" works, saving companies time and money, while providing a competitive advantage for publishers and the enterprise.

1 Claim, 8 Drawing Sheets

U.S. PATENT DOCUMENTS

| | | | |
|---|---|---|---|
| 2006/0200468 A1* | 9/2006 | Brown et al. | 707/9 |
| 2007/0033655 A1* | 2/2007 | Dawson | 726/27 |
| 2007/0198934 A1* | 8/2007 | Averett et al. | 715/741 |
| 2008/0040618 A1* | 2/2008 | Andersson et al. | 713/193 |
| 2008/0235141 A1* | 9/2008 | Hilerio et al. | 705/59 |
| 2008/0279534 A1* | 11/2008 | Buttars | 386/94 |
| 2008/0307530 A1* | 12/2008 | Lee et al. | 726/26 |
| 2008/0320603 A1* | 12/2008 | Ito | 726/28 |
| 2009/0012832 A1* | 1/2009 | Greenstein | 705/8 |
| 2009/0158440 A1* | 6/2009 | Dang et al. | 726/26 |
| 2009/0165083 A1* | 6/2009 | McLean et al. | 726/1 |
| 2009/0199299 A1* | 8/2009 | McKinnon et al. | 726/26 |
| 2011/0191485 A1* | 8/2011 | Umbehocker | 709/229 |
| 2012/0166258 A1* | 6/2012 | Clemm et al. | 705/14.1 |

OTHER PUBLICATIONS

Heng Guo, Digital Rights Management(DRM) Using XrML, all pages, 2001.*
DRM Specification Approved Version 2.0.2, Open Mobile Alliance Ltd., all pages, Jul. 23, 2008.*
Karen Coyle, Rights Expression Languages A Report for the Library of Congress, all pages, Feb. 2004.*
DRM Rights Expression Language Approved Version 2.0.2, Open Mobille Alliance (OMA) Ltd., all pages, Jul. 23, 2008.*

* cited by examiner

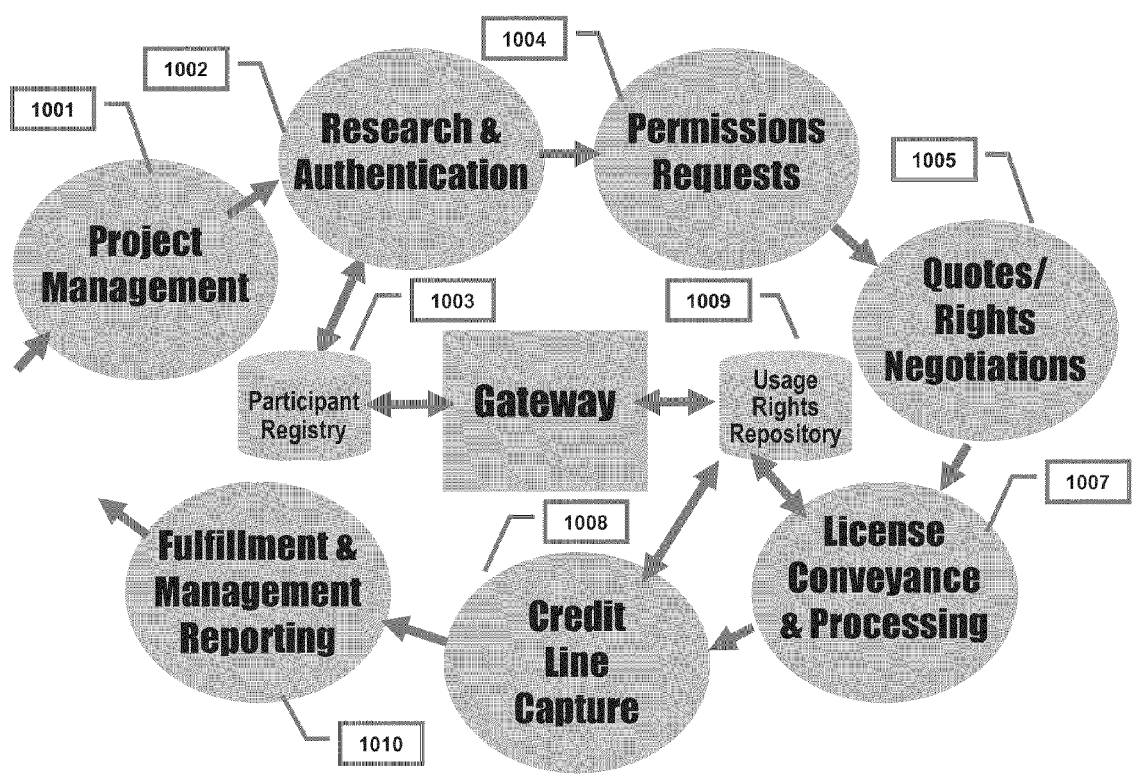

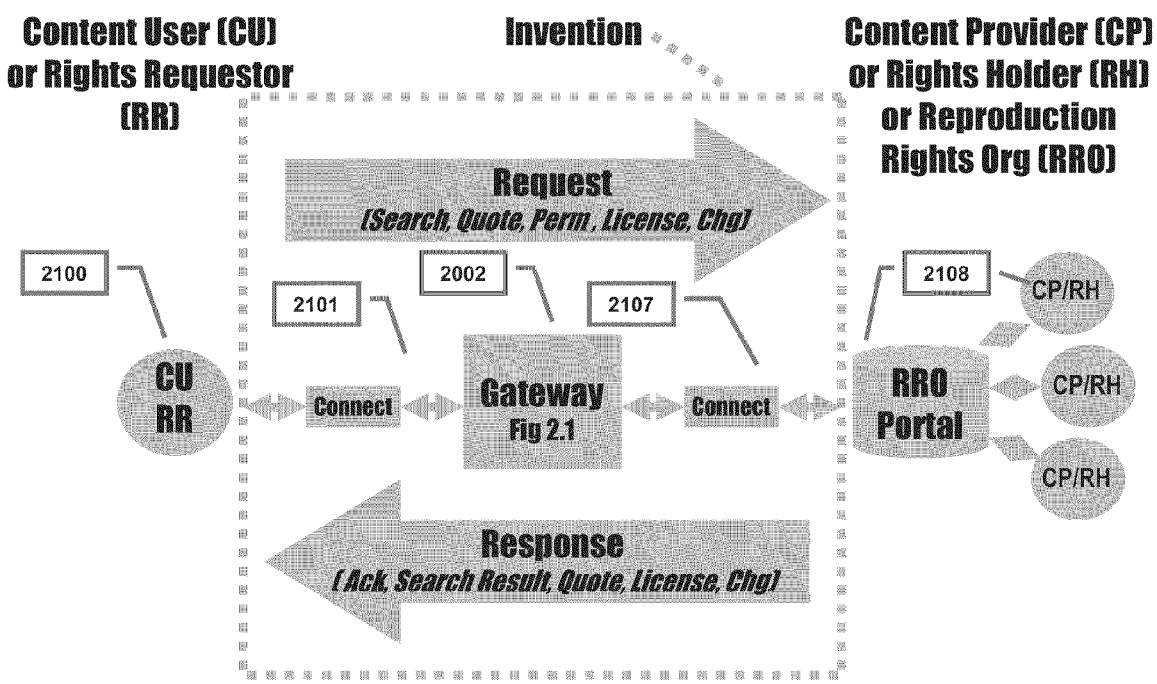
Figure 2.0

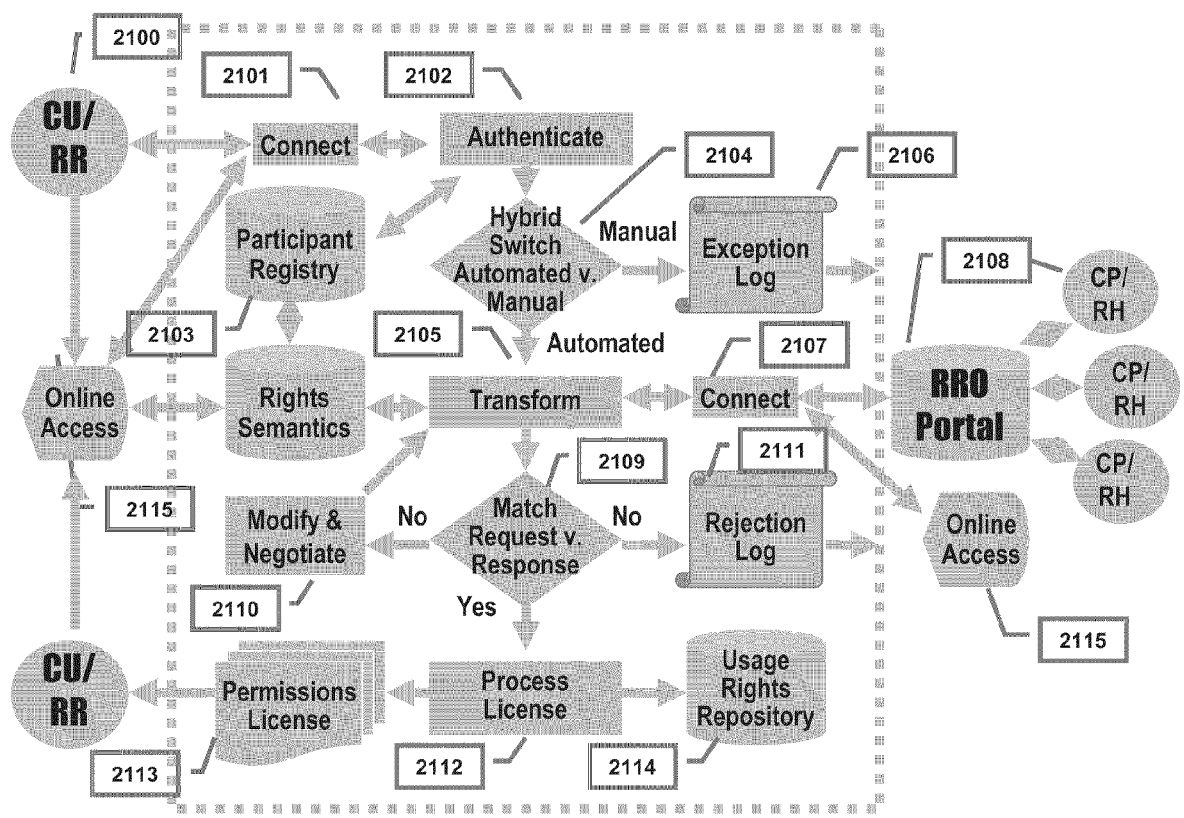
Figure 2.1

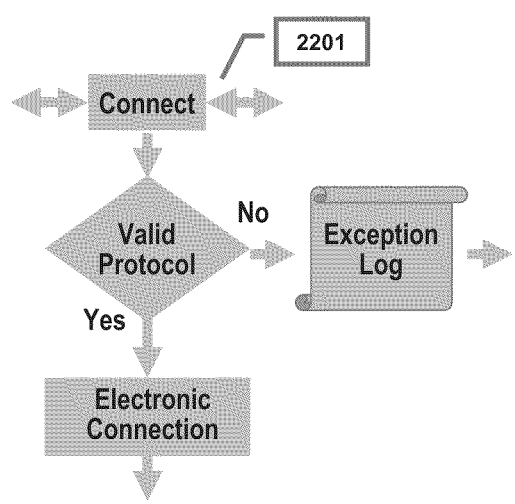
Figure 2.2

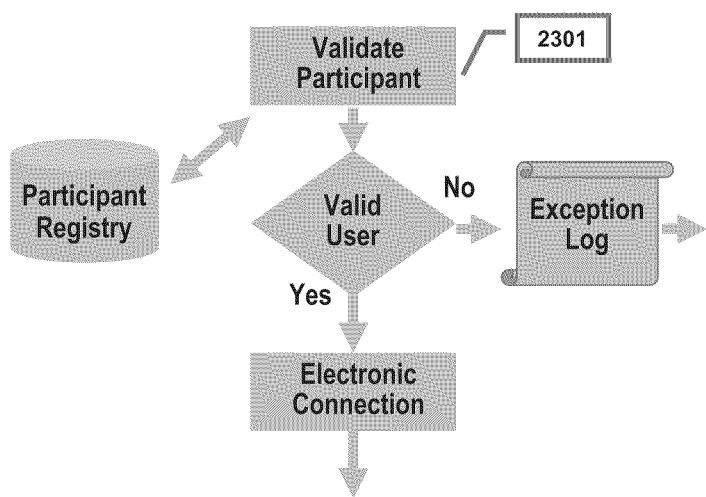
Figure 2.3

Figure 2.4a
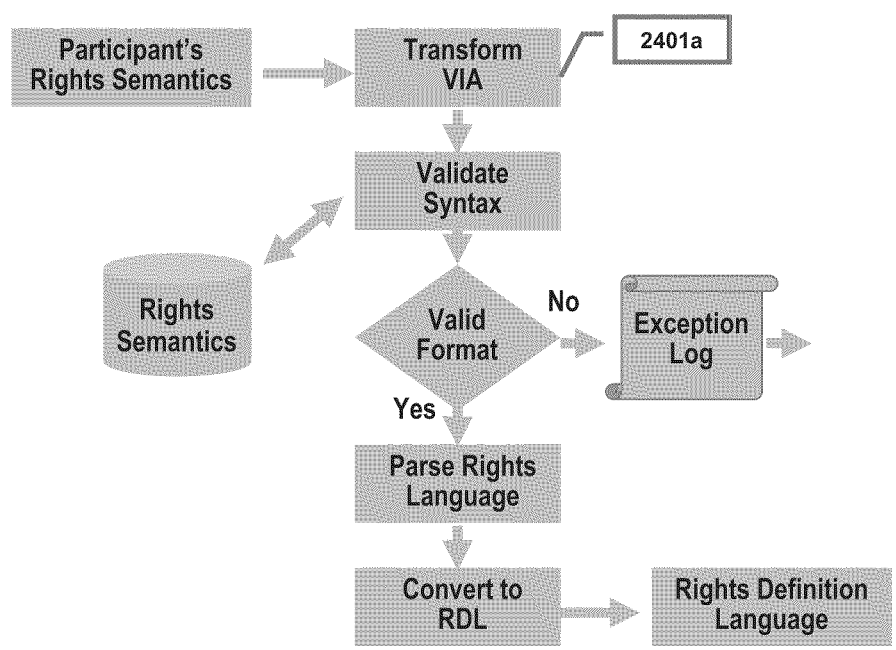

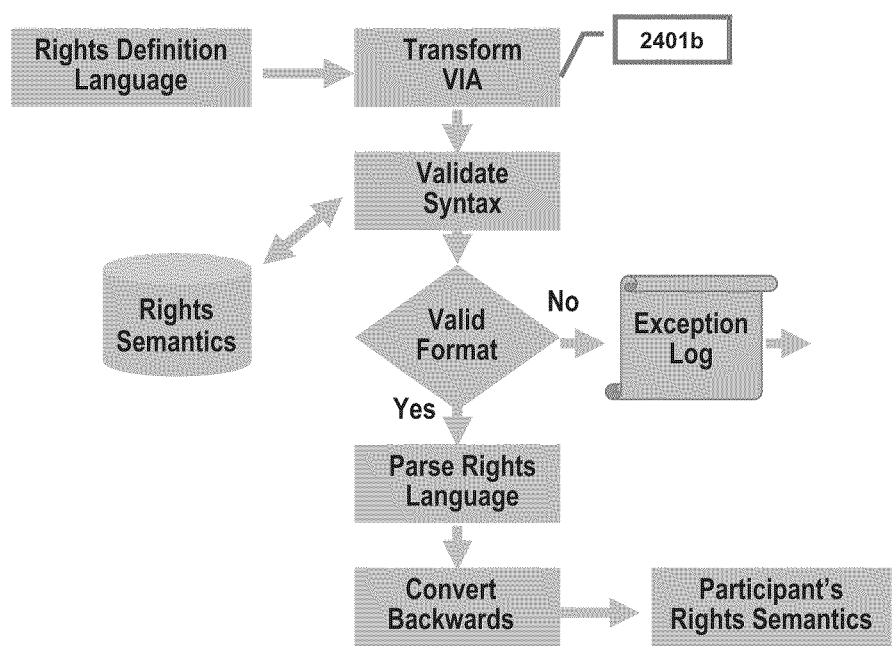
Figure 2.4b

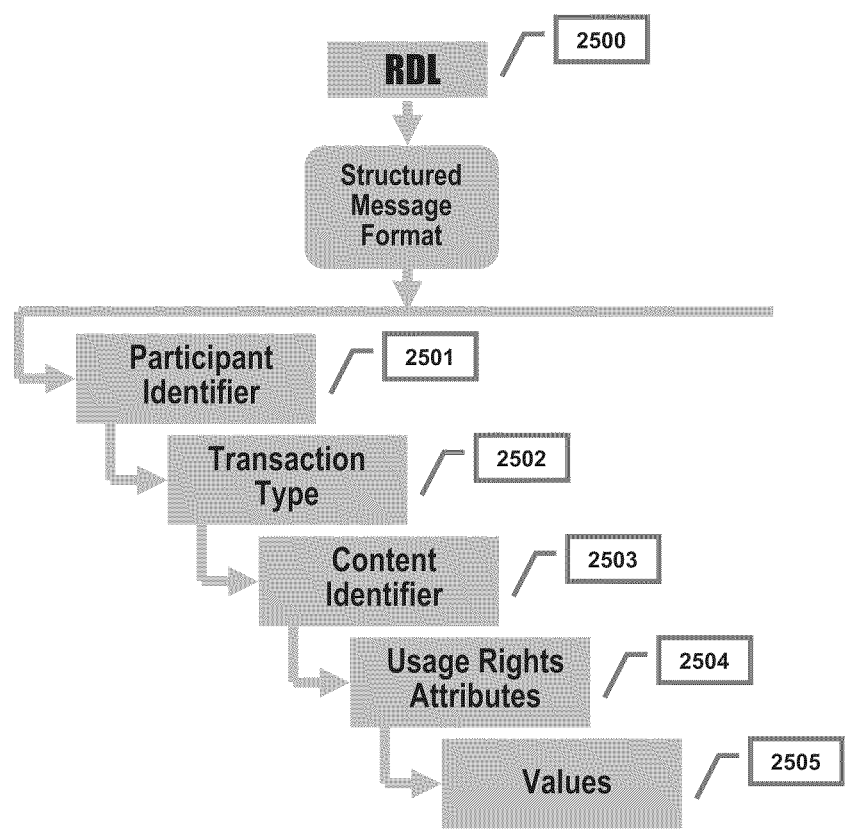
Figure 2.5

AUTOMATED DIGITAL EXPRESS GATEWAY FOR LICENSING AND ACQUIRING RIGHTS AND PERMISSIONS FOR 3RD PARTY COPYRIGHTED CONTENT

REFERENCE TO RELATED APPLICATIONS

This patent application claims the benefit of U.S. Provisional Application No. 61/297,850 filed on Jan. 25, 2010, the disclosure of which is incorporated herein by reference in its entirety.

BACKGROUND OF THE INVENTION

1. Field of the Invention

The present invention provides a method and system for researching, procuring and issuing rights and permissions and generating licenses for third party copyrighted material which includes identifying and authenticating rights-holders, rights value coding, credit lines capture, and payment processing using a secure hosted digital gateway via a computer adapted to communicate via the internet with a computer.

2. Description of Related Art

Today's industry standard publishing practice for using third party copyrighted material within a new publication for print, online, digital, e-book, audio, video, or reprint, requires a manual, labor-intensive, time-consuming process. Such processing can take up to 12 weeks or more to complete, includes, inter alia: (a) project managing the permissions process; (b) researching for sources and authenticating rights-holders from various databases and registries; (c) manually constructing and formatting permissions request letters with understandable rights request language, specifications and conditions, and mailing, faxing or e-mailing to sources; and (d) constant follow-up to ensure receipt of request. Furthermore, today's practice typically requires that for each content item, a separate request for permission is processed manually, using labor-intensive methods with no systems for automating and/or bulk processing of all permissions required for a new work (i.e., book, article, DVD, CD-ROM, blog, newsletter and other publications in print, online or electronic format) which typically requires a separate permission request for each item of $3^{rd}$ party content.

Once the receipt of the requests are verified, the process still requires: (e) clarifying permissions request language and requested rights language; (f) negotiating permissions language, usage rights, terms and fees; (g) manual or computer-assisted preparation of permission responses, licenses and invoices; (h) manual review of licenses for legal descriptions and usage rights in conformance with rights requested; (i) manual processing of license paperwork; and (j) manual interpretation of rights language and posting rights values and credit lines from the license(s) into a usage rights repository.

In addition, the following operations must also be conducted: general ledger coding and processing the invoice through accounts payable, payment processing and reporting permissions status and metrics to production.

With the rapid adoption of new reading and audio/video devices, like—e-books, e-readers, tablets, and streaming video players, publishers are seeking to reduce lead-times by getting permissions for $3^{rd}$ party content faster, in order to get products to market faster.

It should be noted that there have been previous attempts to address these rights issues for digital products. For example U.S. Pat. No. 5,715,403, the disclosure of which is hereby incorporated herein in its entirety by reference, discloses a system for attaching usage rights to a digital work, and particularly to a musical digital work. Similarly, an organization called Rightscom, Ltd developed a "Rights Expression Language" called MPEG-21, seeking to create a usage rights language for digital works. However, these interfaces fail to address the multitude of processing necessary to achieve a true end-to-end automated platform for requesting permissions, granting permissions and acquiring licenses.

SUMMARY OF THE INVENTION

In an exemplary embodiment of the present invention, there is disclosed a method of using a first computer that performs transaction steps which communicates over the internet to a second computer comprising:

processing real time or batch requests among participants using disparate rights management systems and platforms, which include a content user "CU" or a rights requestor "RR", a content provider "CP" or a rights holder "RH" or a rights depository/reproduction rights organization "RRO";

connecting participants to an electronic "Gateway" for automated communications among participants via the internet;

transforming each participant's rights semantics and expressions to and from a common rights definition language "RDL";

matching transformed responses from content providers "CP" and reproduction rights organizations "RRO" against the transformed specifications from the content user "CU";

modifying/negotiating with "CP" and "RRO" for a conforming response;

processing acceptable conforming responses for $3^{rd}$ party licenses of copyrighted content; and accessing online to the gateway to input transactions;

wherein at least one of the computers generates a license via the gateway which grants rights and permissions for copyrighted content.

In another exemplary embodiment of the present invention, there is disclosed a system of using a first computer that performs transaction steps which communicates over the internet to a second computer comprising:

a processor for processing real time or batch requests among participants using disparate rights management systems and platforms, which include a content user "CU" or a rights requestor "RR", a content provider "CP" or a rights holder "RH" or a rights depository/reproduction rights organization "RRO";

a gateway connecting participants for automated communications via the internet;

transforming means for transforming each participant's rights semantics and expressions to and from a common rights definition language "RDL";

matching means for matching transformed responses from content providers "CP" and reproduction rights organizations "RRO" against the transformed specifications from the content user "CU";

providing modifying/negotiating means with "CP" and "RRO" for a conforming response;

providing processing means for acceptable conforming responses for $3^{rd}$ party licenses of copyrighted content; and means for accessing online to the gateway to input transactions;

wherein at least one of the computers generates a license via the gateway which grants rights and permissions for copyrighted content.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

The drawings graphically depict the workflow and process of the present invention. Other aspects, features, and advantages of the present invention will become more fully apparent from the following detailed description, the appended claim, and the accompanying drawings in which similar elements are given similar reference numerals.

FIG. 1.0—Permissions Workflow Overview is a flowchart depicting the end-to-end workflow process for project management, researching, requesting and acquiring permissions for $3^{rd}$ party content material; it embodies "best-practice" Project Management methods of transforming a Request for Permission into License which enables re-use, reprint and/or republication of a specific article or material.

FIG. 2.0—Overall Transaction Process is a flowchart depicting the present invention and external interfaces with a representation of specific transaction requests;

FIG. 2.1—Gateway Transaction Processing is a flowchart showing the sequence of processes embodied in the present invention;

FIG. 2.2—Connect is a flowchart showing the preferred means for connecting participants to the "Gateway" embodied in an "EXP" Plug-in Module;

FIG. 2.3—Authenticate is a flowchart showing the preferred means for authenticating participants;

FIGS. 2.4a—Transform and 2.4b—Reverse Transform are flowcharts showing the transformation and translation from a participant's rights semantics language into a rights definition language "RDL", and reversing the transformation and translation from "RDL" back to the participant's rights semantics language;

FIG. 2.5—Rights Definition Language is a flowchart illustrating the structure of the rights definition language "RDL".

DESCRIPTION OF THE PREFERRED EMBODIMENT

The present invention provides a computerized system that automates all the key functions required to acquire and/or grant permissions and issues licenses for use of third party copyrighted material. The invention comprises a computer system which includes:

(a) processing real time or batch requests among participants using disparate rights management systems and platforms, which include a content user "CU" or a rights requestor "RR", and a content provider "CP" or a rights holder "RH" or a rights depository/reproduction rights organization "RRO";

(b) connecting participants to an electronic "Gateway" for automated communications among participants;

(c) authenticating the participants;

(d) switching from automated processing to manual processing for non-compliant transactions;

(e) transforming each participant's rights semantics and expressions to and from a common rights definition language "RDL";

(f) matching transformed responses from content providers "CP" and reproduction rights organizations "RRO" against the transformed specifications from the content user "CU";

(g) modifying and negotiating with "CP" and "RRO" and re-submitting the request transaction, if the previous response is non-conforming;

(h) processing acceptable conforming responses for $3^{rd}$ party licenses of copyrighted content, conveyance of digital or paper licenses, posting usage rights and terms to a "Usage Rights Repository", and payment processing;

(i) online access to the gateway to input transactions, query and report permissions status, view and print licenses and invoices, management reports, including negotiated savings and performance metrics.

Participants include a potential content user "CU" or a rights requestor "RR" of the material, and the "owner(s)" or content provider "CP" of the material which may include one or more authors, estate(s), copyright claimant(s), rights holder "RH", rightsholder depository portal or reproduction rights organization "RRO".

The computer system further includes means for rejecting a transaction if a participant is not identified or authenticated, the material sought is not available, the requested material is not available from the owner, or the rights requested to re-use said material is not available from the owner.

In order to practice the present invention, a library or participant registry is stored in the computer. The library includes a directory of participants as well as hyperlinks to a rights semantics library and hyperlinks to directories of materials, licenses, licensing fees, and so forth to enable the requisite interfacing between the participants.

The invention also requires a transaction processor or electronic gateway, as shown graphically in FIG. 2.1. The gateway comprises a computer system for machine-to-machine communications for enabling secure electronic transactions processing among disparate computer systems and platforms. The invention is comprised of: computerized data processing, algorithms and software which connect the participants to the gateway, authenticate participants, auto/manual switch, transform requests from content user "CU" into a common rights definition language, match requests against responses, modify and negotiate non-conforming responses and resubmit, process licenses for conforming responses, as paper or digital documents, capture and extract credit lines and usage rights and post to usage rights repository.

If a request cannot be fulfilled by the Gateway because a participant cannot be authenticated or "CP" and/or "CU" cannot be found, or the rights semantics are ambiguous or cannot be transformed, then the Gateway rejects the transaction and reverts to manual business methods (i.e., "hybrid" approach).

Thus, the present invention provides an end-to-end automated streaming workflow process which enables real-time or batch processing to grant and acquire $3^{rd}$ party content licenses.

In order to present a clear and consistent description of the present invention, the following is a glossary of acronyms and terms, as used herein:

Content Provider "CP", also known as Rights Holder "RH" is the author(s) or estate(s) of an original work, trustee, copyright claimant or legal rights-holder(s) of the work, empowered to transfer and/or sell usage rights and issue licenses to Content Users.

Content User "CU", also known as Rights Requestor "RR" is the potential user and requestor of $3^{rd}$ party content—for reprint or use in a new published work for educational, reference, commercial or other purposes; typically authors or publishers of a book, article, journal, newspaper, magazine, blog, CD, DVD, e-book or streaming audio/video device; a CU may also be a CP—by licensing works for which it holds copyrights, to other CUs.

Credit Line Capture "CLC comprises means for capturing, decoding and recording the specific credit line attribution for each element and recording values (i.e., including location of the content in the final publication) in an accessible and searchable database repository and a data log.

Reproduction Rights Organization "RRO" references an agent, service or portal hosting several CP's copyrighted works, such as, copyright portals, book rights registries, company's website, etc. The Portal typically provides for searching for a specific work (i.e., publication, article, journal, chapter, DVD track, etc.) and for identifying rights-holder(s), alternative usage rights available and respective licensing fees, and acts as clearinghouse for issuing licenses and collecting royalty payments due the rights-holders.

Participants include CUs, RRs, CPs, RHs and RROs.

Rights Management System "RMS" also known as an Asset Management System, is a CU's internal system for managing usage rights and permissions status. Typically, it is a proprietary editorial/production system used by publishers, editors, authors and agents to control and track all content elements (i.e., articles) of a publication including: textual and image content, required usage rights, layout, design, creative and production elements of a publication; as well as contracts with stakeholders and contact information related to authors, developmental editors, permissions, production, distribution, etc. The RMS may be a robust enterprise-level database computer system or simple electronic "Perm Log" using a spreadsheet or word processing list.

Rights Definition Language "RDL" provides means for structuring usage rights transactions and messages in a common rights definition language; as well as for communicating with participants. It also provides means for defining transactions among participants, thereby enabling an electronic dialog between CU and CP and/or RRO, including transactions for a library search for the content owner(s), a library search for certain $3^{rd}$ party content, search results, request for quotations, request for permissions, request for invoice, fee negotiation requests, usage rights negotiations requests, change requests, issuance of quotation, issuance of permissions, issuance of invoice, payment processing, etc. It also enables requests for content entities (such as: text article, poem, photograph, illustration, chart, logo, digital video, audio segment, etc.), requests for usage rights (i.e., distribution rights, conditions, limitations, fees, payment terms, term limits, media distribution format(s), language(s), translations, geographic territories, context, re-use options, etc.) associated with the content entities and royalty fees associated with usage rights; enabling the Gateway to automatically initiate transaction processes, negotiate, and unambiguously identify matches between CU and CP and/or RRO transactions, include Participant Identifier, Transaction Type, Content Identifier, Usage Rights Attributes, and Values.

EXP Plug-in Module or "EXP" defines means to electronically "connect" the Gateway to multi-vendor systems and disparate rights protocols used by CUs, CPs and RROs; as well as means for expanding connectivity to non-standard and standard rights expressions, semantics and transactions protocols used by CUs, CPs and RROs; and as means for upgrading the functionality of CUs, CPs and RROs legacy RMS, preserving their investment.

"Gateway" is a computer system deployed as means for facilitating automated communications among disparate rights management systems, licensing systems, CU systems, CP systems, reproduction rights organizations and platforms, or "Participants"; including means for electronically connecting participants, or "EXP" Plug-in module; means for authenticating participants; means for switching "Hybrid Switch" to enable automated processing for compliant transactions, or manual processing for non-compliant transactions; means for transforming each participant's rights semantics and expressions to and from a common rights definition language "RDL"; means for matching transformed transactions responses from CPs and RROs with the transformed specifications from CU; means for modifying the request and negotiating with the CPs and RROs, and reprocessing the request transaction, if the previous response is out of spec. The Gateway also includes means for processing acceptable conforming responses for $3^{rd}$ party licenses of copyrighted content, consent agreements, permissions agreements, billing and payment processing including creation and conveyance and transformation of digital or paper licenses and posting usage rights, fees and terms metadata to a "Usage Rights Repository"; as well as optionally including means for online access to the gateway to input transactions, query and report permissions status, view and print licenses, invoices and management reports, including negotiated savings and performance metrics.

"Hybrid Switch" comprises software as means for processing both automated and manual transactions; and as means for shifting from "automatic" to "manual" mode for transactions that are identified as gateway compliant and non-gateway compliant, respectively.

Rights Value Capture "RVC" is means for capturing, decoding and recording specific usage rights granted by a CP or RRO for each content element (i.e., article), and recording as metadata in a searchable Usage Rights Repository "URR" including: usage conditions, limitations and terms, fees, payment terms, term limits, media distribution format(s), language(s), translations, geographic territories, number of copies or book run, context, re-use for future editions and/or derivative works, etc.

Participant Registry is a directory of participants which includes contact information, rights policies and parameters, usage and contact preferences, as well as hyperlinks to participant's rights semantics library, and hyperlinks to other portals containing materials, license options, fees, and usage limitations to enable the requisite interfacing with the gateway and participants.

Rights Semantics Library is a library of coded standard and non-standard usage rights languages, definitions, syntax, semantics and values—as used in the industry or by a specific participant; also used by the Virtual Interactive Agents "VIA" as means for translating usage rights language used by participant to a common Rights Definition Language "RDL" and as means for reverse transformation from RDL back to the participant's usage rights language.

Usage Rights is a definition of the "rights" associated with a content element or article, including allowable media distribution format(s) (i.e., Print, on-line, public website, password-protected website, intranet, electronic files, e-books, compatible e-readers, search directories, CD-ROMs, DVDs or other physical, digital, audio or holographic media formats), language(s), translations, geographic territories, re-use options, etc.

Usage Rights Repository "URR" defines means for recording and archiving Usage Rights "granted" for each content element, in a searchable database repository.

Virtual Interactive Agents "VIA" comprises software as means for translating and transforming each participant's rights semantics and expressions into a common rights definition language "RDL". It also performs backward translations and transformations from "RDL" to the participant's rights expression language.

Now, with references to the drawings and as noted above, the invention generally comprises transaction steps which are carried out with a computer, comprising:

(a) processing real time or batch requests among participants using disparate rights management systems and platforms, which include a content user "CU" or rights requestor "RR", and a content provider "CP" or rights holder "RH" or a rights depository/reproduction rights organization "RRO";
(b) connecting participants to an electronic "Gateway" for automated communications among participants;
(c) authenticating the participants;
(d) switching from automated processing to manual processing for non-compliant transactions;
(e) transforming each participant's rights semantics and expressions to and from a common rights definition language "RDL";
(f) matching transformed responses from content providers "CP" and reproduction rights organizations "RRO" against the transformed specifications from the content user "CU";
(g) modifying and negotiating with "CP" and "RRO" and re-submitting the request transaction, if the previous response is non-conforming;
(h) processing acceptable conforming responses for $3^{rd}$ party licenses of copyrighted content, conveyance of digital or paper licenses, posting usage rights and terms to a "Usage Rights Repository", and payment processing;
(i) online access to the gateway to input transactions, query and report permissions status, view and print licenses and invoices, management reports, including negotiated savings and performance metrics.

The computerized process also includes: (h) means for rejecting a request if a participant is not authenticated, the material sought is not available, or the requested material is not available from the owner, or fees are not acceptable.

Now, with reference to the drawings and in particular FIG. 1.0—Permissions Workflow Overview as shown, the present invention provides an end-to-end workflow process for researching, requesting and acquiring permissions for $3^{rd}$ party content material. It also manages the workflow processes including: Project Management, block 1001, Research & Authentication, block 1002, using a Participant Registry, block 1003, Permissions Requests, block 1004, Quotes and Rights Negotiations, block 1005, License Conveyance & Processing, block 1007, Credit Line Capture, block 1008, Posting License metadata (i.e., Terms, Fees, Usage Rights and Exceptions to a Usage Rights Repository, block 1009, and Fulfillment & Management Reporting, block 1010.

Referring to FIG. 2.0—Overall Transaction Process, a CU/RR initiates a "Request" Transaction for Search, Quote, Permissions, Consents, Licenses, Change Orders, Invoices and other request(s), as needed to research, budget, identify rights-holder(s), acquire permissions and licenses, negotiate, make changes and pay for licenses. To initiate the request(s), the CU/RR, block 2100, connects, block 2101, to the Gateway, block 2002, and the Gateway connects, block 2007, to one or more RROs, CPs and RHs, block 2108, to carry out the transactions.

Looking at FIG. 2.1—Gateway Transaction Processing, there is shown a more detail description of the Gateway process. CU/RR initiates a "Request" for Research Searches, Quotations, Permissions Agreements, Consent Agreements, Licenses, Negotiation Requests, Changes Notices, Payment Processing and other requests, as needed to accomplish the intended result of acquiring permissions, consents for content elements, or determining that said items are "fair use" or "public domain".

In order to accomplish this, the Gateway facilitates automated communications among disparate rights management systems, licensing systems, reproduction rights organizations and platforms (i.e., "Participants"); including means for electronically connecting participants "EXP", means for authenticating participants, means for switching "Hybrid Switch" to determine automated processing or manual processing; means for transforming each participant's rights semantics and expressions to and from a common rights definition language "RDL"; means for matching transformed responses from the CPs and/or RROs with the transformed request from the CU; means for modifying the request and negotiating with CPs and/or RROs, and reprocessing the request transaction, if the previous response is non-conforming; means for processing license for acceptable conforming responses for $3^{rd}$ party licenses, permissions agreements, consent agreements, billing and payment processing including creation and conveyance of digital or paper licenses and posting usage rights, fees and terms metatdata to a "Usage Rights Repository"; and means for online access to the gateway to input transactions, query and report permissions status, view and print licenses, invoices, and management reports, including negotiated savings and performance metrics.

In FIG. 2.1—the CU/RR, block 2100, Connects, block 2101, to the Gateway using an EXP Plug-in software module and the requestor and transaction type is Authenticated, block 2102, by validating against a Participant Registry, block 2103. Authenticated users and transactions are tested in the Hybrid Switch, block 2104, if conforming to specs are permitted for Automated processing. If non-conforming to specs, the transaction is redirected for Manual processing and posted in an electronic Exception Log, block 2106, Conforming transactions are Transformed, block 2105, into a common Rights Definition Language "RDL" and then Connected, block 2107, to an RRO, CP or RH, block 2108, to make a transaction request. The RRO, CP or RH then responds and is Connected, block 2107, to the Gateway. The Response is Transformed, block 2105, into a common Rights Definition Language "RDL". The Gateway then compares the Response against the Request, for a Match, block 2109. If the Response does not match (i.e., based on licensing terms, fees, usage rights and other parameters) but is within the parameters for negotiations, then the Request is Modified for Negotiation, block 2110, and Transformed, block 2105, and resent as another Request by Connecting, block 2107, to the RRO, CP or RH. The new Responses are compared against the Modified Request, for a Match, block 2109. The system uses information about the CU/RR, as stored in the Participant Registry, to determine if alternative offers will be made. For example, based on the specific rights policies stored in the Participant Registry, the module may modify the usage rights requested, or the maximum fee amount it will pay, and resubmits the Request transaction in order to attempt to receive a conforming response. This is a recursive procedure, and may occur several times in order to get a positive outcome.

This process may repeat up to the number of loops specified by the Negotiation Algorithm. If there is No Match and the number of Negotiation loops or other limit(s) or condition(s) are exceeded, then the Response Transaction is Rejected and Posted to an Electronic Rejection Log, block 2111.

If a Match is made within the limit set, then the Response (typically a License) is Processed, block 2112.

This process includes posting license metatdata (i.e., fees, terms, usage rights, exceptions and other parameters) to a Usage Rights Repository, block 2114, and creating or conveying a Permissions License, block 2113, (in electronic format) to the CU/RR.

At any point in this process, the CU/RR or RRO/CP/RH may access the Gateway using Online Access, block 2115, to view permissions and negotiations status, performance metrics and Print Licenses or other Management Reports.

Additionally, as shown in FIG. 2.2, a Connect module uses EXP Plug-in software to connect all Participants to the Gateway using a suitable electronic means.

EXP can embody any available communications protocol, including: Web Services using Simple Object Access Protocol (SOAP) messages, typically conveyed using HTTP with XML serialization; spreadsheet file formats (XLS, DIF, CSV, PRN, SLK, etc.); merge files formats in comma-separated values (CSV) or tab delimited format (TXT); word processing formats (TXT, DOC, DOCX, RTF, HTM, HTML, etc.); file uploads from a client to server and downloads from a server to client, in any available protocol (FTP—File Transfer Protocol, FTPS—FTP over implicit TLS/SSL, FTPES—FTP over explicit TLS/SSL, SFTP—SSH File Transfer Protocol); E-mail file attachments, etc. EXP also embodies an open architecture as a means for creating universal customized plug-ins and communications protocols for any multi-vendor proprietary platform and any emerging book industry standards, digital rights management standards, and motion picture industry rights standards. The preferred means for communications is Web Services or FTP transfer of XLS spreadsheets or CSV merge file formats.

As shown in FIGS. 2.1, 2.4*a* and 2.4*b*, for compliant transactions, the Virtual Interactive Agents "VIA" transform the Participant's rights semantics and expressions into a common rights definition language "RDL", using a rights semantics library stored in the Gateway.

For gateway compliant transactions, as shown in FIGS. 2.1 and 2.4*a*, in order to forward the transaction request to CP's and/or RRO's, the Virtual Interactive Agents "VIA" are activated to transform the transactions from the Participant's rights semantics and expressions to "RDL". Then the Virtual Interactive Agents "VIA" are activated again to reverse transform, as shown in FIG. 2.4*b*, the transactions from "RDL" to the CP's and/or RRO's specific rights semantics and expressions. This enables CP's and/or RRO's to understand, process the request, and issue a transaction response back to the gateway.

Upon receipt of a response from CP's and/or RRO's, the Virtual Interactive Agents "VIA" are activated again to transform the response transactions from the CP's rights semantics and expression back to "RDL", using a rights semantics library. Then the Virtual Interactive Agents "VIA" are activated again to reverse transform from "RDL" back to the CU's rights semantics and expression, as shown in FIGS. 2.1 and 2.4*b*.

Throughout the process, the CU and RRO/CP have optional online access, as shown in FIG. 2.1, block 2115, to query and report permissions status, view and print licenses, invoices and management reports, including negotiated savings and performance metrics.

It is to be appreciated that in order to carry out the myriad of functions, the RRO Portal, as shown in FIG. 2.1, represents repositories and portals supported by Reproduction Rights Organizations "RRO" or other copyright portals. Thus, the RRO functions as an agent, service or rightsholders' portal hosting several CP's copyrighted works (such as: copyright portals, book rights registries, company's website, etc.); the Portal typically provides for searching for a specific work (i.e., publication, article, journal, chapter, DVD track, etc.) and for identifying rights-holder(s), alternative usage rights available and respective licensing fees, and acts as clearinghouse for issuing licenses and collecting royalty payments due the rights-holders.

Now, referring to FIG. 2.5, an essential feature of the present invention is the Rights Definition Language "RDL", block 2500. The "RDL" provides means for structuring usage rights transactions and messages in a common rights definition language for communicating with participants.

It is to be further understood that the present invention is not to be construed as precluding other means for carrying out certain functions. For example, while the preferred embodiment for transformation and translations is "VIA", as shown in FIGS. 2.1, 2.4*a* and 2.4*b*, other means for translating can be used.

It is appreciated from the preceding, that the invention, using a computer, automates the permissions transaction process of procuring and processing licenses real-time or by batch, reducing lead-times from many weeks or months to hours, automatically transforming and translating requests and responses for global e-commerce among multi-vendor systems and non-standard rights semantics and languages, eliminating or reducing manual labor effort, negotiating licensing fees to conform with specifications, protecting rights-holders' intellectual property rights and assuring rights-holders they are fairly compensated and paid for their work, identifying "public domain" and/or "fair use" works, saving companies time and money, while providing a competitive advantage for publishers and the enterprise.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A method of using a first computer that performs transaction steps which communicates via Internet or a secure electronic network to a second computer, comprising:

processing real time or batch requests among participants using disparate rights management systems and platforms, which include a content user "CU" or a rights requestor "RR", a content provider "CP" or a rights holder "RH" or a rights depository/reproduction rights organization "RRO";

connecting participants to an electronic Gateway for automated communications among the participants via Internet or the secure electronic network;

transforming each participant's rights semantics and expressions to and from a common rights definition language "RDL";

matching transformed responses from the content provider "CP" and the rights depository/reproduction rights organization "RRO" against the transformed rights semantics and expressions to and from the common rights definition language "RDL" from the content user "CU";

modifying with the content provider "CP" and the rights depository/reproduction rights organization "RRO" for a conforming response;

processing acceptable conforming responses for 3rd party licenses of copyrighted content; and accessing the electronic Gateway via Internet or the secure electronic network to input transactions;

wherein at least one of the first computer and the second computer:
  transforms the copyrighted content into a usage right and
  generates a license via the electronic Gateway which grants rights and permissions for the copyrighted content;

wherein the participants are authenticated;

wherein the processing real time or batch requests among participants is switched from automated to manual processing in responsive to non-compliant transactions;

wherein the real time or batch requests are re-submitted in responsive to any prior non-conforming response;

wherein the electronic Gateway has a computer system for machine-to-machine communications for enabling secure electronic transactions processing among disparate computer systems and platforms;

wherein the electronic Gateway rejects a transaction and reverts to manual processing responsive to:
  an unauthenticated request,
  the content provider "CP" or the content user "CU" cannot be found, or
  the rights semantics are ambiguous or cannot be transformed.

* * * * *